US012700658B2

(12) United States Patent
Shi et al.

(10) Patent No.: US 12,700,658 B2
(45) Date of Patent: Aug. 4, 2026

(54) METHOD AND DEVICE FOR ADJUSTING AN ANGLE OF AN ANTENNA

(71) Applicant: TP-LINK CORPORATION LIMITED, Hong Kong (CN)

(72) Inventors: Hongjiang Shi, Shenzhen (CN); Zhihui Ke, Shenzhen (CN); Chen Wu, Shenzhen (CN); Zhuobin Wang, Shenzhen (CN); Shu Wen, Shenzhen (CN)

(73) Assignee: TP-LINK CORPORATION LIMITED, Hong Kong (CN)

( * ) Notice: Subject to any disclaimer, the term of this patent is extended or adjusted under 35 U.S.C. 154(b) by 107 days.

(21) Appl. No.: 18/721,673

(22) PCT Filed: Nov. 30, 2022

(86) PCT No.: PCT/CN2022/135323
§ 371 (c)(1),
(2) Date: Jun. 19, 2024

(87) PCT Pub. No.: WO2023/124713
PCT Pub. Date: Jul. 6, 2023

(65) Prior Publication Data

US 2025/0055172 A1 Feb. 13, 2025

(30) Foreign Application Priority Data

Dec. 30, 2021 (CN) ......................... 202111650883.7
Dec. 30, 2021 (CN) ......................... 202123430405.3

(51) Int. Cl.
*H01Q 1/12* (2006.01)
*H01Q 3/00* (2006.01)

(52) U.S. Cl.
CPC ........... *H01Q 1/1257* (2013.01); *H01Q 3/005* (2013.01)

(58) Field of Classification Search
CPC ........ H01Q 1/1257; H01Q 3/005; H01Q 3/04; H01Q 3/08; H01Q 3/02
See application file for complete search history.

(56) References Cited

U.S. PATENT DOCUMENTS 6,075,330 A * 6/2000 Terk ........................ H01Q 3/005 455/3.03
2010/0317298 A1* 12/2010 Hakansson .............. H01Q 3/26 455/67.13
(Continued)

FOREIGN PATENT DOCUMENTS

CN 101312358 A 11/2008
CN 103746924 A * 4/2014
(Continued)

OTHER PUBLICATIONS

Extended Search Report, European Application No. 22913968.8, dated Mar. 10, 2025, 10 pages.
(Continued)

*Primary Examiner* — Regis J Betsch
*Assistant Examiner* — Jose A. Miranda Gonzalez
(74) *Attorney, Agent, or Firm* — Loeb & Loeb LLP

(57) ABSTRACT

The present disclosure relates to the technical field of antennas, and discloses a control method, a control component and a control device. The control method includes: acquiring a rotation angle of an antenna in an initial adjustment, and controlling, through a motor component, the antenna to rotate by the rotation angle in the initial adjustment; and iteratively controlling, through the motor component and in a plurality of adjustments after the initial adjustment, the antenna to rotate until an iterative termination condition is met

13 Claims, 7 Drawing Sheets

(56) References Cited

U.S. PATENT DOCUMENTS

| | | | | |
|---|---|---|---|---|
| 2018/0175498 | A1* | 6/2018 | Kurniawan | H01Q 3/005 |
| 2018/0233819 | A1* | 8/2018 | Royalty | H01Q 3/32 |
| 2022/0365174 | A1* | 11/2022 | Mihlin | G01S 7/4086 |

FOREIGN PATENT DOCUMENTS

| | | | |
|---|---|---|---|
| CN | 105338588 | A | 2/2016 |
| CN | 110838622 | A | 2/2020 |
| CN | 108390734 | B | 12/2020 |
| CN | 114465002 | A | 5/2022 |
| CN | 216903349 | U | 7/2022 |
| GB | 2564397 | A | 1/2019 |

OTHER PUBLICATIONS

International Search Report issued in App. No. PCT/CN2022/135323, dated Feb. 22, 2023, 6 pages.

* cited by examiner

METHOD AND DEVICE FOR ADJUSTING AN ANGLE OF AN ANTENNA

CROSS-REFERENCE TO RELATED APPLICATION(S)

The present application is a US national phase filing of International Application No. PCT/CN2022/135323, filed on Nov. 30, 2022, which claims the priority of China Patent Application No. CN202111650883.7 filed on Dec. 30, 2021 and the priority of China Utility Model Application No. CN202123430405.3 filed on Dec. 30, 2021, the disclosures of which are incorporated by reference in their entirety as a part of the present application.

TECHNICAL FIELD

The present disclosure relates to the technical field of antennas, in particular to a control method, a control component and a control device.

BACKGROUND

At present, most home wireless routers take use of omnidirectional antennas. However, in practical use, it is difficult for a home wireless router to achieve an ideal uniform radiation of 360 degrees. Instead, there are dominant radiation directions and inferior radiation directions for the home wireless router. When a user terminal is located in a dominant radiation direction of an antenna, the signal strength is higher and the user experience is better. Since user terminals are often mobile, the radiation direction of the home wireless router's antenna needs to rotate with the movement of the user terminal, so that the advantageous radiation direction of the antenna faces the user terminal, thereby improving communication quality and enhancing the user experience.

However, current home wireless routers often take a long time to adjust the radiation direction of the antenna, leading to poor real-time performance in angle adjustment, which affects the user experience. Additionally, the rotation dimension of the antennas in current home wireless routers is single. No matter how the antenna is rotated, it may lead to low signal strength and poor communication quality in certain areas.

Therefore, it is necessary to improve the existing methods and devices for adjusting an angle of an antenna.

SUMMARY

The embodiments of the present disclosure provide a control method, including: acquiring a rotation angle of an antenna in an initial adjustment, and controlling, through a motor component, the antenna to rotate by the rotation angle in the initial adjustment; and iteratively controlling, through the motor component and in a plurality of adjustments after the initial adjustment, the antenna to rotate until an iterative termination condition is met, in which the iteratively controlling, through the motor component, the antenna to rotate includes: in each of the plurality of adjustments, determining a difference between a value of a received signal strength indicator of the antenna after a previous adjustment and a value of a received signal strength indicator of the antenna before the previous adjustment; and determining the rotation angle of the antenna in a current adjustment based on the difference and the rotation angle of the antenna in the previous adjustment, and controlling, through the motor component, the antenna to rotate by the rotation angle in the current adjustment.

The embodiments of the present disclosure provide a control component, configured to: generate, in a process of iteratively adjusting an angle of at least one antenna, an instruction indicating the at least one antenna to rotate in each of adjustments based on a corresponding received signal strength indicator of the at least one antenna; in which, in an initial adjustment, the instruction indicates that the rotation angle of the antenna in this adjustment is a preset value, or the instruction indicates that the rotation angle of the antenna in this adjustment is a value associated with the corresponding received signal strength indicator of the at least one antenna; in each of the adjustments except for the initial adjustment, the instruction indicates that the rotation angle of the antenna in this adjustment is associated with the rotation angle of the antenna in a previous adjustment.

The embodiments of the present disclosure provide a control device including a control component and a motor component, the control device configured to: acquire, by the control component, a rotation angle of at least one antenna in an initial adjustment, generate an instruction corresponding to the rotation angle of the at least one antenna in the initial adjustment, and send the instruction to the motor component; control, by the motor component, the at least one antenna to rotate by the rotation angle based on the instruction; and iteratively control, in a plurality of adjustments after the initial adjustment, the at least one antenna to rotate until an iterative termination condition is met, in which the iteratively controlling the at least one antenna to rotate includes: in each of the plurality of adjustments, determining, by the control component, a difference between a value of a received signal strength indicator of the at least one antenna after a previous adjustment and a value of a received signal strength indicator of the at least one antenna before a previous adjustment; determining, by the control component, the rotation angle of the at least one antenna in a current adjustment based on the difference and the rotation angle of the at least one antenna in the previous adjustment; generating, by the control component, an instruction corresponding to the current adjustment based on the rotation angle of the at least one antenna in the current adjustment, and sending the instruction corresponding to the current adjustment to the motor component; and controlling, by the motor component, the at least one antenna to rotate by the rotation angle based on the instruction corresponding to the current adjustment.

The embodiments of the present disclosure provide a method for adjusting an angle of an antenna, which is performed by a main control module and includes: acquiring an initial RSSI value; generating, with an initial value of i as 1, an instruction according to the i-th rotation step-size and sending it to a motor control module, so that the motor control module controls an antenna to rotate according to the instruction and a pre-configured rotation control model for mechanical antenna; acquiring an RSSI value after the rotation of the antenna, and calculating a difference between the initial RSSI value and the RSSI value after the rotation; updating the i-th rotation step-size to obtain the (i+1)th rotation step-size; determining whether an iterative termination condition is met, and if so, ending an adjustment of an angle of an antenna; or if not, adding one to i, and returning to the step of generating an instruction according to the i-th rotation step-size and sending it to a motor control module.

The embodiments of the present disclosure provide a device for adjusting an angle of an antenna, which is disposed in a main control module and includes: a data acquisition module, for acquiring an initial RSSI value; an instruction module, for generating, with an initial value of i as 1, an instruction according to the i-th rotation step-size and sending it to the motor control module, so that the motor control module controls an antenna to rotate according to the instruction and a pre-configured rotation control model for mechanical antenna; a difference calculation module, for obtaining an RSSI value after the rotation of the antenna and calculating a difference between the initial RSSI value and the RSSI value after the rotation; a step-size update module, for updating the i-th rotation step-size to obtain the (i+1)th rotation step-size; an iteration decision module, for determining whether an iterative termination condition is met, and if so, ending the adjustment of angle of an antenna; or if not, adding one to i, and returning to the step of generating an instruction according to the i-th rotation step-size and sending it to the motor control module.

The embodiments of the present disclosure provide a method for adjusting an angle of an antenna, which is performed by a motor control module and includes: receiving an instruction sent by a main control module; and controlling an antenna to rotate according to the instruction and a pre-configured rotation control model for mechanical antenna.

The embodiments of the present disclosure provide a system for adjusting an angle of an antenna, which includes a main control module, a motor control module and at least one antenna, in which at least one motor is disposed on the antenna, the main control module is communicatively connected with the motor control module, the main control module is used for performing the method for adjusting an angle of an antenna according to any of the first aspects, and the motor control module is used for performing the method for adjusting an angle of an antenna according to any of the third aspects.

The embodiments of the present disclosure provide an antenna angle adjusting device includes a base and at least one antenna, in which the antenna includes an antenna body, a first joint component and a second joint component; one end of the first joint component is rotatably connected with the antenna body, the other end of the first joint component is rotatably connected with one end of the second joint component, and the other end of the second joint component is rotatably connected with the base.

Optionally, the first joint component is internally provided with a first motor for driving the antenna body to rotate around the first joint component; the second joint component is internally provided with a second motor for driving the first joint component and the antenna body to rotate around the second joint component; the base is internally provided with a third motor for driving the second joint component, the first joint component and the antenna body to rotate around one end of the base.

Optionally, the embodiments of the present disclosure also provide a router, including the antenna angle adjusting device as described above.

BRIEF DESCRIPTION OF DRAWINGS

In order to illustrate the technical features of the embodiments of the present disclosure more clearly, the drawings needed to be used in the embodiments of the present disclosure will be briefly introduced below. Obviously, the drawings described below are merely some of the embodiments of the present disclosure. For those skilled in the art, other drawings can be obtained according to these drawings without creative labor.

DETAILED DESCRIPTION

Figure 1:
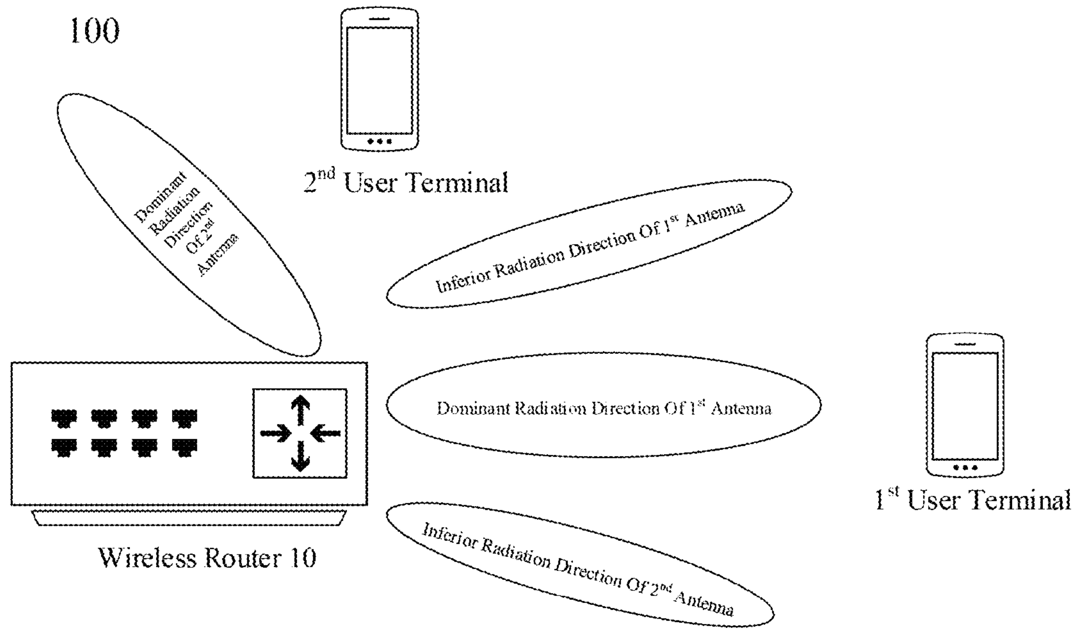
FIG. 1 is an application scenario for a router according to an embodiment of the present disclosure.

In order to make the objectives, technical schemes and advantages of the present disclosure more obvious, the exemplary embodiments according to the present disclosure will be described in detail below with reference to the drawings. Obviously, the described embodiments are merely part of the embodiments of the present disclosure, not all of them, and it should be understood that the present disclosure is not limited by the example embodiments described here.

In the present specification and drawings, the substantially same or similar operations and element are denoted by the same or similar reference numerals, and the repetitive descriptions of such operations and elements will be omitted. Meanwhile, in the description of the present disclosure, terms such as "first", "second" and the like are only used to distinguish descriptions, and cannot be understood as indicating or implying relative importance or ranking.

First, an application scenario for a method and a corresponding device according to an embodiment of the present disclosure is described with reference to FIG. 1. FIG. 1 is a schematic diagram showing an application scenario according to an embodiment of the present disclosure.

Various embodiments of the present disclosure are applicable to wireless local access network (WLAN) communication systems with several wireless transmitters, such as IEEE 802.11 standard WLAN access points that support several communications with mobile devices. As shown in FIG. 1, a method and device for adjusting direction of antenna according to an embodiment of the present disclosure can be applied to any wireless router 10. A wireless router 10 is a router with wireless coverage function for users to surf the Internet. The wireless router can be regarded as a repeater which forwards, through antennas, broadband network signals to nearby user terminals, e.g., a first user terminal and a second user terminal shown in FIG. 1. The first user terminal and the second user terminal can be mobile phones, tablet computers, notebook computers, desktop computers, Personal Computers (PCs), smart speaker boxes or smart watches, etc., all of which can optionally support WiFi protocol.

The wireless router 10 includes at least one antenna. In wireless networks, an antenna, which can achieve a purpose of enhancing wireless signals, can be used as an amplifier for wireless signals. As shown in FIG. 1, it is assumed that the wireless router 10 includes a first antenna and a second antenna. The first antenna and the second antenna have different radiating capabilities or receiving capabilities in different directions in space. For example, the first antenna has a dominant radiation direction for the first antenna and an inferior radiation direction for the first antenna. Similarly, the second antenna also has its dominant radiation direction and its inferior radiation direction. The wireless router may further include more or less antennas, which is not limited by the present disclosure of course.

The first user terminal may be located at the dominant radiation direction for the first antenna, so the first user terminal can receive a signal from the wireless router with stronger received signal strength. However, the second user terminal is neither located in the dominant radiation direction for the first antenna nor in the dominant radiation direction for the second antenna. The received signal strength of the second user terminal is relatively lower, resulting in a poor user experience. In order to improve the user experience of the second user terminal, it is possible to attempt to adjust the radiation direction of the second antenna by rotating the second antenna, so that the second user terminal can also receive the signal with stronger received signal strength.

At present, schemes for adjusting antenna's radiation direction of a wireless router can be mainly classified into two categories: "electrical scanning" and "mechanical scanning", in which "electrical scanning" is a beam scanning realized by changing state of electronic components on antenna to change performance of antenna, whereas "mechanical scanning" is a beam scanning realized by driving antenna to rotate through a motor. The "electrical scanning" schemes and "mechanical scanning" schemes have respective advantages and disadvantages in terms of three aspects: range and accuracy of the beam scanning, variability of the gain and shape of the beam, as well as speed of the beam scanning.

Specifically, the "electrical scanning" schemes can change a beam's gain and shape by changing phases of signals of antenna array units. However, the gain and shape of a beam of mechanical antenna are physical characteristics of each antenna itself, which are fixed and unchangeable. Therefore, the "electrical scanning" schemes have higher flexibility in terms of adjusting the gain and shape of the beam. Meanwhile, the scanning speed of the "electrical scanning" schemes is also higher than that of the "mechanical scanning" schemes. However, a beam scanning range of an "electrical scanning" schemes is often limited by a shape of antenna array (such as plane array and linear array), whose scanning range is often smaller than that of the "mechanical scanning" schemes. Meanwhile, a beam scanning accuracy of an "electrical scanning" schemes is also limited by the incapability of electronic components to continuously change their states, whose scanning accuracy is also less than that of the "mechanical scanning" scheme.

Various embodiments of the present disclosure mainly relate to utilizing a "mechanical scanning" scheme to adjust a rotation angle of an antenna. Some of the embodiments of the present disclosure can further incorporate an "electrical scanning" scheme to further fine-tune the transmitting angle, shape and gain of the beam. The present disclosure is not limited thereto.

In some traditional "mechanical scanning" schemes, it is often required for a user to manually rotate antenna to adjust a coverage angle of an antenna. Since it is often difficult to achieve an optimal angle of an antenna by user's manual adjustment, such schemes cannot achieve a good adjustment effect. In some other traditional "mechanical scanning" schemes, it is required to traverse, by the processor of the home wireless router, the relationship between an antenna angle and motor parameter to find the optimal antenna angle. This whole process takes a long time, resulting in poor real-time adjustment of the angle of the router's antenna and poor user experience. In addition, in a traditional home router, motors are all installed inside a router body. When the motors are installed in the horizontal direction, the antenna can only perform rotational movement. When the motors are installed in the vertical direction, the antenna can only perform telescopic movement. The mechanical movement of the antenna is relatively simple, which results in certain areas having low signal strength and poor communication quality regardless of how the antenna is adjusted.

To this regard, the embodiments of the present disclosure provide a control method, including: acquiring a rotation angle of an antenna in an initial adjustment, and controlling, through a motor component, the antenna to rotate by the rotation angle in the initial adjustment; and iteratively controlling, through the motor component and in a plurality of adjustments after the initial adjustment, the antenna to rotate until an iterative termination condition is met, in which the iteratively controlling, through the motor component, the antenna to rotate includes: in each of the plurality of adjustments, determining a difference between a value of a received signal strength indicator of the antenna after a previous adjustment and a value of a received signal strength indicator of the antenna before the previous adjustment; and determining the rotation angle of the antenna in the current adjustment based on the difference and the rotation angle of the antenna in the previous adjustment, and controlling, through the motor component, the antenna to rotate by the rotation angle in a current adjustment.

The embodiments of the present disclosure also provide a control component, configured to: generate, in a process of iteratively adjusting an angle of at least one antenna, an instruction indicating the at least one antenna to rotate in each of adjustments based on a corresponding received signal strength indicator of the at least one antenna; in which, in an initial adjustment, the instruction indicates that the rotation angle of the antenna in this adjustment is a preset value, or the instruction indicates that the rotation angle of the antenna in this adjustment is a value associated with the corresponding received signal strength indicator of the at least one antenna; in each of the adjustments except for the initial adjustment, the instruction indicates that the rotation angle of the antenna in this adjustment is associated with the rotation angle of the antenna in a previous adjustment.

The embodiments of the present disclosure also provide a control device including a control component and a motor component. The control device is configured to: acquire, by the control component, a rotation angle of at least one antenna in an initial adjustment, generate an instruction corresponding to the rotation angle of the at least one antenna in the initial adjustment, and send the instruction to the motor component; control, by the motor component, the at least one antenna to rotate by the rotation angle based on the instruction; and iteratively control, in a plurality of adjustments after the initial adjustment, the at least one antenna to rotate until an iterative termination condition is met, in which the iteratively controlling the at least one antenna to rotate includes: in each of the plurality of adjustments, determining, by the control component, a difference between a value of a received signal strength indicator of the at least one antenna after a previous adjustment and a value of a received signal strength indicator of the at least one antenna before the previous adjustment; determining, by the control component, the rotation angle of the at least one antenna in the current adjustment based on the difference and the rotation angle of the at least one antenna in the previous adjustment; generating, by the control component, an instruction corresponding to the current adjustment based on the rotation angle of the at least one antenna in the current adjustment, and sending the instruction corresponding to the current adjustment to the motor component; and controlling, by the motor component, the at least one antenna to rotate by the rotation angle based on the instruction corresponding to the current adjustment.

Compared with the traditional "mechanical scanning" schemes and the traditional home routers, the methods and devices provided by various embodiments of the present disclosure can detect a better value of RSSI (Received signal strength indicator) step by step, and can quickly iterate to an optimal angle of an antenna with fewer iterations, improving the communication quality and enhance the user experience. Moreover, the methods and devices provided by various embodiments of the present disclosure also conduct control over rotation angles of a plurality of motors by means of establishing a model, improving the synchronization of the control over the plurality of motors, also improving the control efficiency, and facilitating the simulation and realization of the control over the rotation of mechanical antennas. The methods and devices provided by various embodiments of the present disclosure can be applied to a router including a base and at least one antenna, so that the at least one antenna can rotate in at least two dimensions, thereby realizing a more flexible control over a coverage angle of an antenna and increasing the adjustable range of angle of an antenna.

Figure 2:
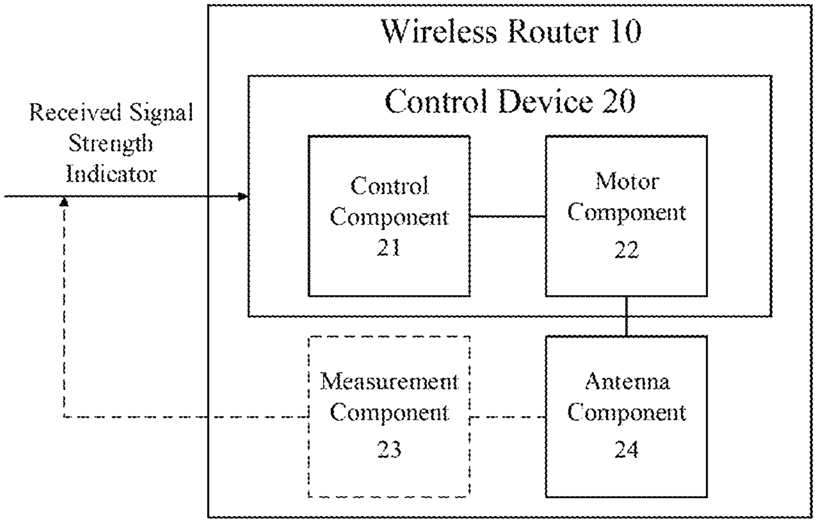
FIG. 2 is a schematic diagram showing a control device according to an embodiment of the present disclosure.
Figure 3:
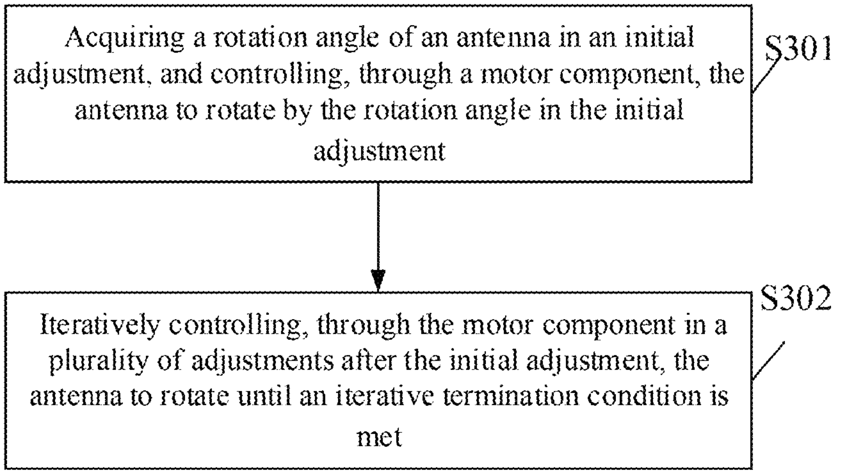
FIG. 3 is a flowchart showing a control method according to an embodiment of the present disclosure.
Figure 4:
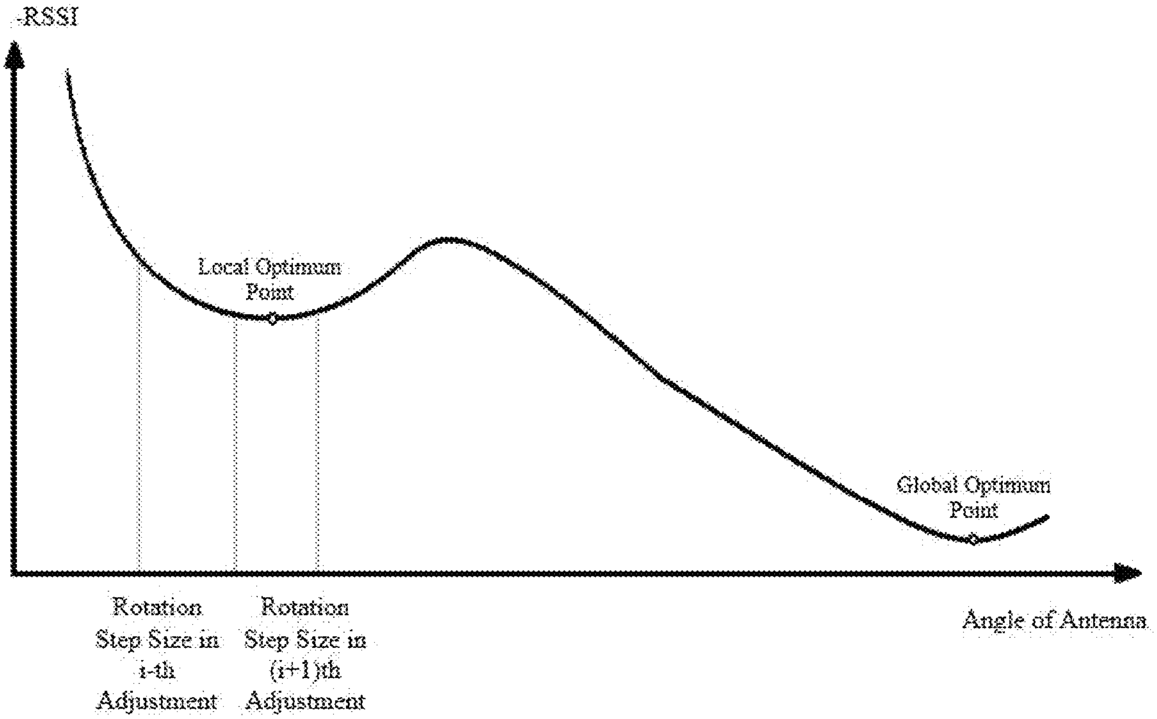
FIG. 4 is a schematic diagram showing a relationship between received signal strength indicator and antenna angle according to an embodiment of the present disclosure.
Figure 5:
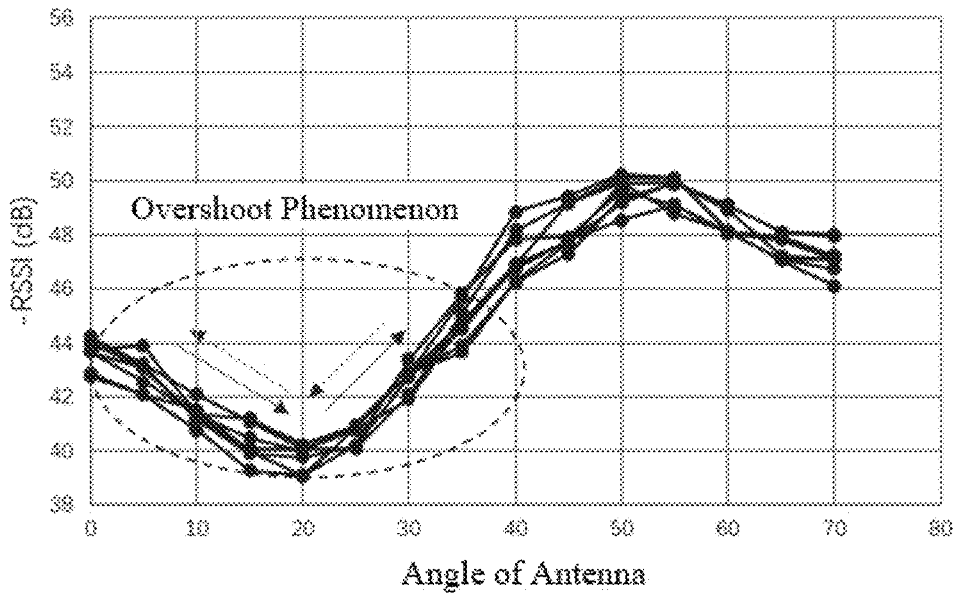
FIG. 5 is a schematic diagram showing an "overshoot phenomenon" according to an embodiment of the present disclosure.
Figure 6:
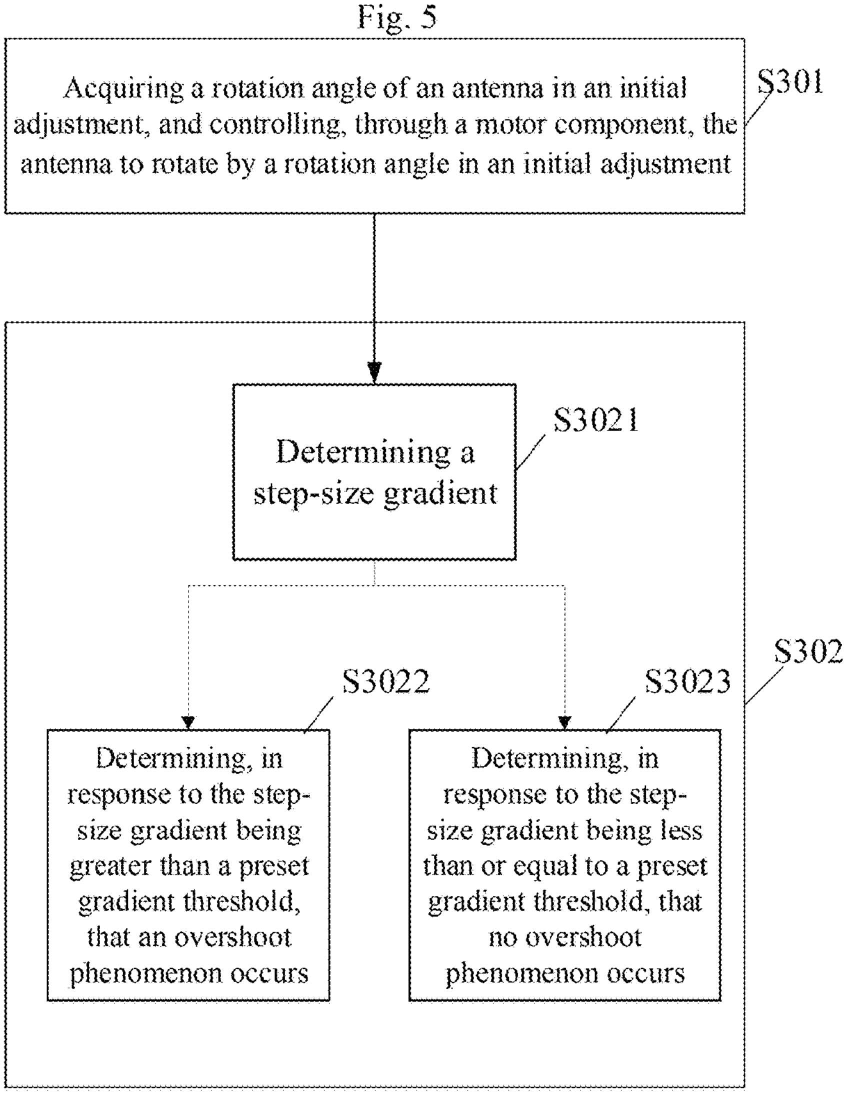
FIG. 6 is yet another schematic diagram showing a control method according to an embodiment of the present disclosure.

Next, a control device 20 and a control method 30 according to an embodiment of the present disclosure will be further described with reference to FIGS. 2 to 6. FIG. 2 is a schematic diagram showing a control device 20 according to an embodiment of the present disclosure. FIG. 3 is a flowchart showing a control method 300 according to an embodiment of the present disclosure. FIG. 4 is a schematic diagram showing a relationship between received signal strength indicator and antenna angle according to an embodiment of the present disclosure. FIG. 5 is a schematic diagram showing an "overshoot phenomenon" according to an embodiment of the present disclosure. FIG. 6 is yet another schematic diagram showing a control method 300 according to an embodiment of the present disclosure.

As shown in FIG. 2, the control device 20 according to the embodiment of the present disclosure includes a control component 21 and a motor component 22. The control device 20 is installed inside or on the wireless router 10 described with reference to FIG. 1, or as one of the components of the wireless router 10. In addition to the control device 20, the wireless router 10 may further include an antenna component 24 and optionally a measurement component 23. It should be understood by those skilled in the art that the present disclosure is not limited thereto. The following illustrations are made with the control device 20 as one of the components of the wireless router 10 as an example, and it should be understood by those skilled in the art that the present disclosure is not limited thereto.

Specifically, the motor component 22 includes at least one motor. The antenna component 24 includes at least one antenna. Rotation of each antenna is controlled by the at least one motor. For example, in an example of the present disclosure, each antenna may be controlled by at least three motors, so that it is controlled to rotate clockwise or counterclockwise with three different rotation axes. Of course, the present disclosure is not limited thereto. A specific example of the cooperation between the motor component 22 and the antenna component 24 will be described later with reference to FIGS. 7 to 14, which will not be detailed here by the present disclosure.

Optionally, one or more signal characteristics (e.g., received signal strength indicator (RSSI)) of received signal strength of each antenna in the antenna component 24 may be measured by the measurement component 23. In addition, a message sent by a first user terminal or a second user terminal may be directly received, and then be analyzed to determine received signal strength indicators corresponding to respective antennas.

In some embodiments of the present disclosure, the control component 21 is configured to: generate, in a process of iteratively adjusting an angle of at least one antenna, an instruction indicating the at least one antenna to rotate in each of adjustments based on a corresponding received signal strength indicator of the at least one antenna; in an initial adjustment, the instruction indicates that the rotation angle of the antenna in this adjustment is a preset value, or the instruction indicates that the rotation angle of the antenna in this adjustment is a value associated with the corresponding received signal strength indicator of the at least one antenna; in each of the adjustments except for the initial adjustment, the instruction indicates that the rotation angle of the antenna in this adjustment is associated with the rotation angle of the antenna in a previous adjustment.

For example, the control component 21 would be used to iteratively control, with the above-described motor component 22, at least one antenna in the antenna component 24 to rotate according to received signal strength indicators corresponding to one or more antennas in the antenna component 24, so as to adjust the dominant radiation directions of these antennas, improving the user experience. For example, specifically, the control component 21 may be configured to: generate, in the process of iteratively adjusting an angle of an antenna, an instruction for adjusting an angle of an antenna based on a received signal strength indicator corresponding to the antenna, in which the instruction indicates the rotation angle of at least one antenna in each adjustment. In the initial adjustment, the rotation angle of the antenna in the initial adjustment is a preset value. Alternatively, the rotation angle of the antenna in the initial adjustment is associated with the received signal strength corresponding to at least one antenna in the antenna component 24. In each of the adjustments except for the initial adjustment, the rotation angle of the antenna in the current adjustment is associated with the rotation angle of the antenna in a previous adjustment. Of course, the present disclosure is not limited thereto.

For example, the control component 21 may be configured to send, in each of the adjustments, the instruction to the motor component 22 through a bus or other connecting lines inside the router, so that the motor module can control, in each of the adjustments, at least one antenna in the antenna component to correspondingly rotate by the rotation angle indicated by the instruction. Of course, the present disclosure is not limited thereto.

Next, method 300 which the above various components cooperate with each other to perform is further described with reference to FIG. 3. As shown in FIG. 3, method 300 includes operations S301 to S302. Of course, the present disclosure is not limited thereto. It is worth noting that method 300 may be performed when the wireless router 10 triggers/enables the control component 21 to iteratively adjust an angle of an antenna. The method 300 may also be automatically performed at a preset occasion according to user settings. Of course, the method 300 may also be performed when the strength of the signal fed back by the user is weak. The present disclosure does not limit the performing occasion of the method 300.

In operation S301, a rotation angle of an antenna in an initial adjustment is acquired, and the antenna is controlled, through a motor component, to rotate by the rotation angle in the initial adjustment.

For example, operation S301, also referred to as a step of initial adjustment, is jointly performed by the above-described control component 21 and motor component 22. It can be understood that the antenna described here is any one of the antenna components 24 described above. Of course, the present disclosure is not limited thereto.

In the antenna angle adjusting process, a rotation angle of an antenna may be an angle by which the antenna is rotated in a given dimension according to a design of the router's antenna, which can also be referred to as a "rotation step-size". The "rotation step-size" is the rotation angle of the antenna in a certain dimension. For example, given a reference position from which a certain antenna is rotated and a positive direction in which it is rotated, the "rotation step-size" may be a value of an angle by which the antenna it rotated in the positive direction relative to the reference position. For example, if the antenna has a rotation axis (also referred to as x-axis) perpendicular to the router's body, the positive direction is the clockwise direction, and the reference position is the position at which the antenna is before the rotation. Then the "rotation step-size" or "rotation angle" being equal to 30 degrees means that the antenna is rotated by 30 degrees from the current position of the antenna in the positive direction of the x-axis. Then the "rotation step-size" or "rotation angle" being equal to −30 degrees means that the antenna is rotated by 30 degrees from the current position of the antenna in the negative direction of the x-axis.

In some embodiments of the present disclosure, the rotation angle of the antenna in the initial adjustment is a preset value. The control component 21 may determine the preset value by querying an initial rotation angle table. Specifically, the initial rotation angle table records the initial rotation angles for each antenna in the antenna component 24 on at least one rotation plane in the first antenna angle adjusting process once the antenna angle adjusting process is triggered. In some examples, the preset value is usually high, for example, in the interval of 30 degrees to 60 degrees, so that the dominant radiation direction of the antenna is obviously adjusted. Of course, the present disclosure is not limited thereto.

In some other embodiments of the present disclosure, the rotation angle of the antenna in the initial adjustment is associated with an initial value of a received signal strength indicator corresponding to the antenna. For example, when the control component 21 is triggered to iteratively adjust an angle of an antenna, the measurement component 23 may be enabled to measure received signal strength corresponding to at least one antenna in the antenna component 24, and generate and send a received signal strength indicator based on the measured value. Then, the control component 21 may receive the received signal strength indicator corresponding to the current moment from the measuring component 23, and take the received signal strength indicator as the initial value of received signal strength indicator corresponding to the antenna. For convenience of calculation, the received signal strength indicator may be the absolute value of the received signal strength. In some other examples, the received signal strength indicator may identify, with one or more bits, the interval in which the received signal strength of the wireless router is located. In some other examples, the received signal strength indicator may even be a received signal strength indicator sent by the user terminal, to indicate the strength of the signal received by the user terminal, or to indicate the strength of the signal estimated by the user terminal and received by the wireless router. Although in the following, all the received signal strength indicators are each the strength of the signal received by the antenna of the wireless router, it should be understood by those skilled in the art that the present disclosure is not limited thereto.

After control component 21 obtains the initial value of a received signal strength indicator corresponding to the antenna, control component 21 would determine, based on this value, the angle by which the antenna should be rotated in at least one dimension in the first antenna angle adjusting process. For example, it is assumed that the initial angle of the antenna in the first dimension is 20 degrees, which indicates that the antenna has an included angle of 20 degrees relative to the horizontal plane. If the control component 21 finds that the initial value of the received signal strength indicator is very small, it is required to greatly adjust the angle of the antenna relative to the horizontal plane. At this time, the control component 21 may determine the rotation angle of the antenna in the initial adjustment as 60 degrees, so that the antenna is nearly perpendicular to the horizontal plane, reaching an included angle of 80 degrees relative to the horizontal plane. The above numerical values are only examples, which is not limited by the present disclosure.

In operation S302, the antenna is iteratively controlled, through the motor component and in a plurality of adjustments after the initial adjustment, to rotate until an iterative termination condition is met.

For example, in some embodiments according to the present disclosure, the iteratively controlling, through the motor component, the antenna to rotate includes: in each of the plurality of adjustments, determining a difference between a value of a received signal strength indicator of the antenna after a previous adjustment and a value of a received signal strength indicator of the antenna before the previous adjustment; and determining the rotation angle of the antenna in the current adjustment based on the difference and the rotation angle of the antenna in the previous adjustment, and controlling, through the motor component, the antenna to rotate by the rotation angle in the current adjustment. Of course, the present disclosure is not limited thereto.

The principle of operation S302 will be further described with reference to FIG. 4. In the antenna angle adjusting process, the rotation angle of the antenna in the previous adjustment would have an influence on the rotation angle in the current adjustment, and the trend of the impact can also be referred to as "momentum", which indicates a contribution of the rotation angle in the previous adjustment to the rotation angle in the current adjustment. The above-described process of "iteratively controlling, through the motor component and in a plurality of adjustments after the initial adjustment, the antenna to rotate until an iterative termination condition is met" can be described as a process of using a "momentum"-based gradient descent method to find an optimal received signal strength. The "momentum"-based gradient descent method can also be referred to as "Momentum". Therefore, the principle of these embodiments of the present disclosure can be described as: calculating a "momentum" based on the "rotation step-size" in the previous adjustment, and utilizing the "momentum" to determine the "rotation step-size" in the current adjustment. Since the "rotation step-size" in the current adjustment is influenced by the "rotation step-size" in the previous adjustment, the received signal strength can be made to converge to an optimal value as soon as possible.

As shown in FIG. 4, on a curve with an angle of an antenna as x-axis and a negative value of the received signal strength indicator (−RSSI) as y-axis, the lowest point of the curve is a point that can make the received signal strength indicator optimal. The process of finding the optimal point can be analogous to a process of dropping a physical ball to the lowest point along the curve. If the direction of the motion of the ball in the current time interval is the same as that of the previous motion of the ball, the ball would have a certain momentum at the beginning of the current time interval, and can move farther, drop faster and reach the lowest point earlier. As shown in FIG. 4, if the rotation direction of the "rotation step-size" in the (i+1)th adjustment is the same as that of the "rotation step-size" in the i-th adjustment, then in the antenna angle adjusting process, a "local optimal point" can be bypassed faster and a "global optimal point" can be iterated to earlier. That is, in FIG. 4, by detecting for a better value of RSSI step by step, the "rotation step-size" for each detection is opposite to the gradient of RSSI change with respect to the angle of an antenna, so as to quickly find an angle with a stronger antenna signal. It is worth noting that FIG. 4 is only a schematic diagram, and the changing relationship between RSSI and an angle of an antenna in the actual antenna angle adjusting process may not be approximate to this curve. The present disclosure does not limit the changing relationship between RSSI and an angle of an antenna.

The principle that some embodiments of the present disclosure can quickly adjust an angle of an antenna has been described above with reference to FIG. 4. Next, an example of the control device 20 implementing operation S302 according to the embodiment of the present disclosure will be described. In this example, the iterative termination condition can be expressed as: the values of received signal strength indicators before and after one of the plurality of adjustments being less than a preset value. Optionally, in this example, the determining the rotation angle of the antenna in the current adjustment based on the difference and the rotation angle of the antenna in the previous adjustment may include: determining, in response to the difference being greater than zero, the rotation angle of the antenna in the current adjustment based on the rotation angle of the antenna in the previous adjustment, in which the direction of the rotation angle of the antenna in the current adjustment is opposite to that of the rotation angle of the antenna in the previous adjustment; and determining, in response to the difference being less than or equal to zero, that the rotation angle of the antenna in the current adjustment is positively correlated with the rotation angle in the previous adjustment.

Specifically, it is assumed that the received signal strength indicator of the antenna is $RSSI_1$ before the initial adjustment, and the rotation angle of the antenna in the initial adjustment is $Step_1$. Moreover, it is assumed that the received signal strength indicator of the antenna is $RSSI_{i-1}$ before the i-th adjustment, the rotation angle of the antenna is $Step_i$ in the i-th adjustment, and the received signal strength indicator of the antenna is $RSSI_i$ after the i-th adjustment. It is worth noting that $RSSI_{i-1}$ and $RSSI_i$ are both absolute values of received signal strength indicators, for which the greater the absolute value is, the weaker the signal strength is. Embodiments of antenna adjustment aim to minimize the absolute value of the received signal strength indicator by adjusting the antenna.

Therefore, it can be solved and derived that the difference between the value $RSSI_i$ of the received signal strength indicator of the antenna after the i-th adjustment and the value $RSSI_{i-1}$ of the received signal strength indicator of the antenna before the previous adjustment is $\Delta RSSI_i$. That is, $\Delta RSSI_i=|RSSI_i|-|RSSI_{i-1}$. If $\Delta RSSI_i$ is greater than zero, it means that the signal strength becomes weak after the i-th adjustment. If $\Delta RSSI_i$ is less than zero, it means that the signal strength becomes stronger after the i-th adjustment.

If the absolute value of $\Delta RSSI_i$ is less than a preset value (e.g., 3 db), then the iterative adjustment of the angle of the antenna can be stopped. The preset value can be a preset convergence accuracy, in which the convergence accuracy is related to the model and performance of the antenna actually applied.

If the absolute value of ΔRSSI is greater than the preset value and $\Delta RSSI_i$ is greater than zero (i.e., the received signal strength is weakened by the rotation of the antenna in the i-th adjustment), it implies that in the i+1-th adjustment, the adjustment can be continued along the direction opposite to the rotation direction in the last adjustment. In the embodiment of the present disclosure, the momentum corresponding to the (i+1)th adjustment is positively correlated to $\Delta RSSI_i$ and negatively related to $Step_i$. For example, the momentum $m_{i+1}$ for the (i+1)th adjustment can be expressed as $m_{i+1}=k*r*\Delta RSSI_i/Step_i$. The rotation angle of the antenna in the (i+1)th adjustment is $Step_{i+1}=-k*Step_i$. Here, k is a momentum attenuation factor and r is a learning rate, both of which are parameters set according to the performance of the wireless router. The minus sign indicates that in this case, the rotation angle in the (i+1)th adjustment is opposite to that in the i-th adjustment. For example, if Stepi>0, it indicates that the rotation in the i-th adjustment is clockwise, with ΔRSSI being greater than 0 as well, which means that the absolute value of RSSI becomes larger, then $Step_{i+1}<0$ is needed in the (i+1)th adjustment to conduct the rotation counterclockwise, making the absolute value of RSSI smaller. It should be understood by those skilled in the art that the present disclosure is not limited thereto.

If the absolute value of $\Delta RSSI_i$ is greater than the preset value and $\Delta RSSI_i$ is less than zero (i.e., the received signal strength is enhanced by the rotation of the antenna in the i-th adjustment), it is required to further decide the angle value and direction of the rotation angle in the (i+1)th adjustment according to the momentum in the i-th adjustment in conjunction with $RSSI_i$ and $Step_i$. In an example of the embodiments of the present disclosure, the control component 21 is configured to: acquire, in response to the difference being less than or equal to zero, the momentum of the antenna in the previous adjustment; determine the momentum of the antenna in the current adjustment based on the rotation angle of the antenna in the previous adjustment, the difference and the momentum of the antenna in the previous adjustment; and determine the rotation angle of the antenna in the current adjustment based on the momentum of the antenna in the current adjustment; in which the momentum of the antenna in the i-th adjustment indicates an influence of the rotation angle in the (i−1)th adjustment on the rotation angle in the i-th adjustment, where i is a positive integer greater than 1. For example, the momentum $m_{i+1}$ for the (i+1)th adjustment can be expressed as $m_{i+1}=k*m_i+r*\Delta RSSI_i/Step_i$. It can be solved and derived that the rotation angle of the antenna in the (i+1)th adjustment is $Step_{i+1}=-m_{i+1}$. Here, k is a momentum attenuation factor and r is a learning rate, both of which are parameters set according to the performance of the wireless router.

It should be noted that in the actual application process, in order to make the RSSI reach a better value as soon as possible, and at the same time to make $\Delta RSSI_i$ larger than an error that may occur when the measuring component 23 measures RSSI, the learning rate r can be set to a larger value. It should be understood by those skilled in the art that the present disclosure is not limited thereto.

Optionally, in the above-described example, the iterative termination condition may further include the antenna having been rotated to a maximum reachable angle. I In practical applications, the antenna rotation axis mostly cannot rotate continuously, and at most can rotate 360 degrees in the same direction, usually less. Alternatively, the iterative termination condition may further include the number of adjustments having reached an adjustment number threshold. The adjustment number threshold may be determined by the user, which reflects a maximum degree of tolerance of the user for the duration of the antenna adjusting process. Exemplarily, the maximum number of iterations is set to 8, and one iteration is about 3 s.

Optionally, in the above-described example, the rotation angle of the antenna in each adjustment conforms to a normative constraint corresponding to the antenna. In the normative constraint, the rotation angle of the antenna in each adjustment is an integer, and the absolute value of the minimum rotation angle of the antenna is 2. Of course, the present disclosure is not limited thereto.

Therefore, in this example, by performing method 300 and by detecting for a better value of RSSI step by step, the control device 20 can rotate the antenna to a position where a signal can be received with a stronger signal strength, with only a small number of iterations, thereby quickly finding an angle that can make the antenna signal stronger.

Next, some other examples of the embodiments of the present disclosure are described with reference to FIGS. 5 to 6. As described above, it is possible to set the learning rate r to a larger value. A larger learning rate r will lead to an accumulation of momentum to a larger value. Due to the accumulation of momentum, an "overshoot phenomenon" is prone to occur in the converging process of a steeper trough. At this time, multiple oscillations may occur at the trough (e.g., at the local optimal point in FIG. 4), making it difficult for RSSI to converge to the optimal value (e.g., at the global optimal point in FIG. 4). Alternatively, in some cases, due to an excessive rotation step-size in a certain adjustment, the antenna may be rotated to an angle too far away from the trough (e.g., the global optimal point in FIG. 4) to return to the vicinity of the trough. The "overshoot phenomenon" is shown in FIG. 5. In FIG. 5, with an angle of an antenna as x-axis and −RSSI as y-axis, an "overshoot phenomenon" occurs at the trough, causing the antenna to be unable to rotate to around 20 degrees and the RSSI to be unable to converge to around 40 dB even after multiple adjustments. In order to further reduce the occurrence of the "overshoot phenomenon" at the trough, operation S302 may further include sub-operations S3021 to S3023 related to "overshoot protection", to reduce the occurrence of trough oscillation phenomenon that is prone to occur in the actual iteration process.

Referring to FIG. 6, in operation S3021, the control component 21 may determine a step-size gradient based on the difference and the rotation angle of the antenna in the previous adjustment. In operation S3022, the control component 22 may determine, in response to the step-size gradient being greater than a preset gradient threshold, that an overshoot phenomenon occurs. In operation S3023, the control component 22 may determine, in response to the step-size gradient being less than or equal to the preset gradient threshold, that no overshoot phenomenon occurs.

For example, the "step-size gradient" in the i-th adjustment can be expressed as $G_i=|\Delta RSSI_i/Step_i|$, where $\Delta RSSI_i$ is the difference between the value of a received signal strength indicator of the antenna after the i-th adjustment and the value of a received signal strength indicator of the antenna before the previous adjustment, and $Step_i$ is the rotation angle of the antenna in the i-th adjustment. If $G_i$ is greater than the preset gradient threshold, it means that the momentum has accumulated to a larger value at this time, and the "overshoot phenomenon" may occur. On the contrary, it means that the "overshoot phenomenon" has not yet occurred.

Optionally, if the "overshoot phenomenon" occurs, the following operations may be further performed by the control component 21: determining whether a difference between a value of a received signal strength indicator of the antenna after a previous adjustment and a value of a received signal strength indicator of the antenna before the previous adjustment is greater than zero; determining, in response to determining that the difference is greater than zero, a rotation angle of the antenna in a current adjustment based on the step-size gradient and the rotation angle of the antenna in the previous adjustment; and determining, in response to determining that the difference is less than or equal to zero, the rotation angle of the antenna in the current adjustment based on a product of the difference and the rotation angle of the antenna in the previous adjustment.

For example, if the "overshoot phenomenon" occurs and $\Delta RSSI_i$ is greater than zero, the momentum of the antenna in the current adjustment may be determined based on the step-size gradient, in which the absolute value of the momentum of the antenna in the current adjustment is positively correlated with the step-size gradient. For example, the momentum $m_{i+1}$ for the (i+1)th adjustment can be expressed as $m_{i+1}=k*r*\Delta RSSI_i/Step_i$. It can be solved and derived that the rotation angle of the antenna in the (i+1)th adjustment is $Step_{i+1}=-m_{i+1}-k*Step_i$.

For another example, if the "overshoot phenomenon" occurs and $\Delta RSSI_i$ is less than or equal to zero, the momentum $m_{i+1}$ for the (i+1)th adjustment can be expressed as $m_{1+1}=0$. It can be solved and derived that the rotation angle of the antenna in the (i+1)th adjustment is $Step_{i+1}=-k*r*\Delta RSSI_i*Step_i$. Here, k is a momentum attenuation factor and r is a learning rate, both of which are parameters set according to the performance of the wireless router. It should be understood by those skilled in the art that the present disclosure is not limited thereto.

If the "overshoot phenomenon" does not occur and $\Delta RSSI_i$ is greater than zero, the momentum $m_{i+1}$ for the (i+1)th adjustment can be expressed as $m_{i+1}=k*r*\Delta RSSI_i/Step_i$. It can be solved and derived that the rotation angle of the antenna in the (i+1)th adjustment is $Step_{i+1}=-k*Step_i$. If the "overshoot phenomenon" does not occur and $\Delta RSSI_i$ is less than zero (i.e., the received signal strength is increased by the rotation of the antenna in the i-th adjustment), the momentum $m_{i+1}$ for the (i+1)th adjustment can be expressed as $m_{i+1}=k*m_i+r*\Delta RSSI_i/Step_i$. It can be solved and derived that the rotation angle of the antenna in the (i+1)th adjustment is $Step_{i+1}=-m_{i+1}$. Here, k is a momentum attenuation factor and r is a learning rate, both of which are parameters set according to the performance of the wireless router. It should be understood by those skilled in the art that the present disclosure is not limited thereto.

Thus, in this example, the control device 20, by executing method 300, can find a better RSSI value through step-by-step detection, and can rotate the antenna to a position where it can receive signals with relatively strong signal strength using only a small number of iterations. During the iteration process, it uses steps related to "overshoot protection" to reduce the trough oscillation phenomenon caused by the "overshoot phenomenon", further reducing the number of iterations.

Figure 7:
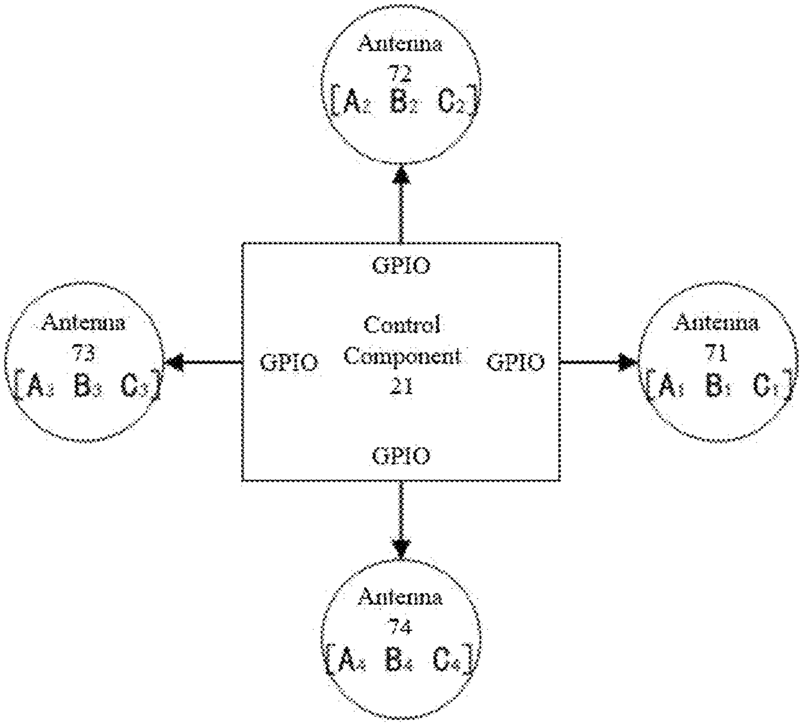
FIG. 7 shows a structural schematic diagram of a router according to an embodiment of the present disclosure.

Next, some details of the control device 20 and the control method 300 according to the embodiments of the present disclosure will be further described with reference to FIG. 7. FIG. 7 shows a structural schematic diagram of a router 10 according to an embodiment of the present disclosure. The antenna component 24 in the router 10 includes 4 antennas. It should be understood by those skilled in the art that 4 antennas are only examples, and the present disclosure does not limit the number of antennas as long as the antenna is controlled by at least one motor in the motor component 22, and each of the at least one motor is used to control the antenna to rotate around a rotation axis in space.

As shown in FIG. 7, the antenna component 24 in router 10 may include 4 antennas, which are respectively shown as an antenna 71, an antenna 72, an antenna 73 and an antenna 74. Each of the antennas is controlled by 3 motors in the motor component 22. The motor component 22 includes a total of 12 motors, each of which is connected to the control component 21 through its general-purpose input/output (GPIO) to receive instruction from the control component 21 for adjusting the angle of the antenna.

Specifically, at this time, the control component 21 is configured to: generate, in a process of iteratively adjusting an angle of at least one antenna, an instruction indicating the at least one antenna to rotate in each of the adjustments based on a corresponding received signal strength indicator of the at least one antenna; in which, in an initial adjustment, the instruction indicates that the rotation angle of the antenna in this adjustment is a preset value, or the instruction indicates that the rotation angle of the antenna in this adjustment is a value associated with the corresponding received signal strength indicator of the at least one antenna; in each of the adjustments except for the initial adjustment, the instruction indicates that the rotation angle of the antenna in this adjustment is associated with the rotation angle of the antenna in the previous adjustment.

For example, the process of iteratively adjusting the angle of at least one antenna is terminated when an iterative termination condition is met, and the iterative termination condition includes at least one of: the values of received signal strength indicators of the at least one antenna before and after one of the plurality of adjustments being less than a preset value, the at least one antenna having rotated to a maximum achievable angle, and the number of adjustments having reached an adjustment number threshold.

For example, in each of the adjustments except for the initial adjustment, the rotation angle of at least one antenna in this adjustment is associated with a difference between a value of a received signal strength indicator of the at least one antenna after the previous adjustment and a value of a received signal strength indicator of the at least one antenna before the previous adjustment.

In one example, the control component 21 controls the motor to rotate by a specific angle by outputting different numbers of pulses, and correspondingly drives the antenna to rotate by the specific angle. As shown in FIG. 7, antenna 71 is controlled by motors $A_1$, $B_1$ and $C_1$ to realize rotations in three dimensions. Similarly, antenna 72 is controlled by motors $A_2$, $B_2$ and $C_2$, antenna 73 is controlled by motors $A_3$, $B_3$ and $C_3$, and antenna 74 is controlled by motors $A_4$, $B_4$ and $C_4$. The position of each of the antennas is determined by the rotation angles of the 3 motors in the antenna. The positions of the respective antennas can be the same or different, that is, the rotation angles of the 12 motors may be completely the same, partially the same, completely different, or the like. The present disclosure is not limited thereto.

In some embodiments of the present disclosure, in order to enable the above-described four antennas to rotate synchronously in different dimensions, so as to avoid that the motor at the back of the order starts late, resulting in non-unified motion is time of the respective antennas, these embodiments of the present disclosure can also adopt a modular and matrix method, so that the control component 21 outputs a certain number of pulses to the 12 GPIO interfaces concurrently, driving the 12 motors to rotate at the same time.

Specifically, a motor angle matrix is denoted as $P_i$, and angles of motors A, B and C at this time are $A_{ji}$, $B_{ji}$ and $C_{ji}$, where j=1, 2, 3, 4 represents 4 antennas, i=0, 1, 2, 3 . . . , represents the i-th adjustment, and i=0 represents the initial adjustment. The value of each element in the matrix represents the rotation angle of each motor, and the positive and negative represent the direction of rotation (clockwise and counterclockwise). $P_0$ is set as an initial state, and it is assumed that all the numerical values in the matrix $P_0$ are 0. That is, it is assumed that at the initial adjustment, the rotation angle of each motor is 0, and each antenna is at the reference position in each dimension. Then after the i-th adjustment, the motor angle matrix $P_i$ is:

$$P_i = \begin{bmatrix} A_{1i} & A_{2i} & A_{3i} & A_{4i} \\ B_{1i} & B_{2i} & B_{3i} & B_{4i} \\ C_{1i} & C_{2i} & C_{3i} & C_{4i} \end{bmatrix}$$

In the i-th adjustment, it is required to control 4 antennas to rotate from the angle matrix $P_{i-1}$ to the angle matrix $P_i$. The control component 21 transfers the values of the matrix $\Delta P_i$ to the motor component 22, where $\Delta P_i=P_i-P_{i-1}$.

Optionally, it can be further considered that each motor has a fixed minimum rotatable angle (also referred to as a stepping angle). For example, motors $A_1$, $B_1$ and $C_1$ may have stepping angles $a_1$, $b_1$, and $c_1$, respectively, which have different rotation axes, so the stepping angles $a_1$, $b_1$, and $c_1$ are all vectors. It is assumed that in the i-th adjustment, the control component 21 outputs $m_{1i}$, $n_{1i}$ and $k_{1i}$ pulses to the motors $A_1$, $B_1$ and $C_1$, respectively. Then the antenna 71 would be rotated in the i-th adjustment by an angle $p_{1i}$, which can be expressed as $p_{1i}=m_{1i}*a_1+n_{1i}*b_1+k_{1i}*c_1$. Similarly, the antenna 72 would be rotated in the i-th adjustment by an angle $p_{2i}$, which can be expressed as $p_{2i}=m_{2i}*a_2+n_{2i}*b_2+k_{2i}*c_2$. The antenna 73 would be rotated in the i-th adjustment by an angle $p_{3i}$, which can be expressed as $p_{3i}=m_{3i}*a_3+n_{3i}*b_3+k_{3i}*c_3$. The antenna 74 would be rotated in the i-th adjustment by an angle $p_{4i}$, which can be expressed as $p_{4i}=m_{4i}*a_4+n_{4i}*b_4+k_{4i}*c_4$.

Therefore, the motor angle matrix $P_{1Q}$ of the antenna 71 after the Q-th adjustment can be expressed as $$P_{1Q}=\sum_{i=0}^{Q}m_{1i}*a_1+\sum_{i=0}^{Q}n_{1i}*b_1+\sum_{i=0}^{Q}k_{1i}*c_1.$$

Similarly, the motor angle matrix $P_{2Q}$ of the antenna 72 after the Q-th adjustment can be expressed as $$P_{2Q}=\sum_{i=0}^{Q}m_{2i}*a_2+\sum_{i=0}^{Q}n_{2i}*b_2+\sum_{i=0}^{Q}k_{2i}*c_2.$$

The motor angle matrix $P_{3Q}$ of the antenna 73 after the Q-th adjustment can be expressed as $$P_{3Q}=\sum_{i=0}^{Q}m_{3i}*a_3+\sum_{i=0}^{Q}n_{3i}*b_3+\sum_{i=0}^{Q}k_{3i}*c_3.$$

The motor angle matrix $P_{4Q}$ of the antenna 74 after the Q-th adjustment can be expressed as $$P_{4Q}=\sum_{i=0}^{Q}m_{4i}*a_4+\sum_{i=0}^{Q}n_{4i}*b_4+\sum_{i=0}^{Q}k_{4i}*c_4.$$

Therefore, control component 21 can control the 12 motors synchronously only by calculating the values of $m_{ji}$, $n_{ji}$ and $k_{ji}$ (where j=1, 2, 3, 4) in the i-th adjustment. The above-described control problem is abstracted into a concise mathematical model, facilitating the simulation and realization of the rotation control over a mechanical antenna.

Figure 8:
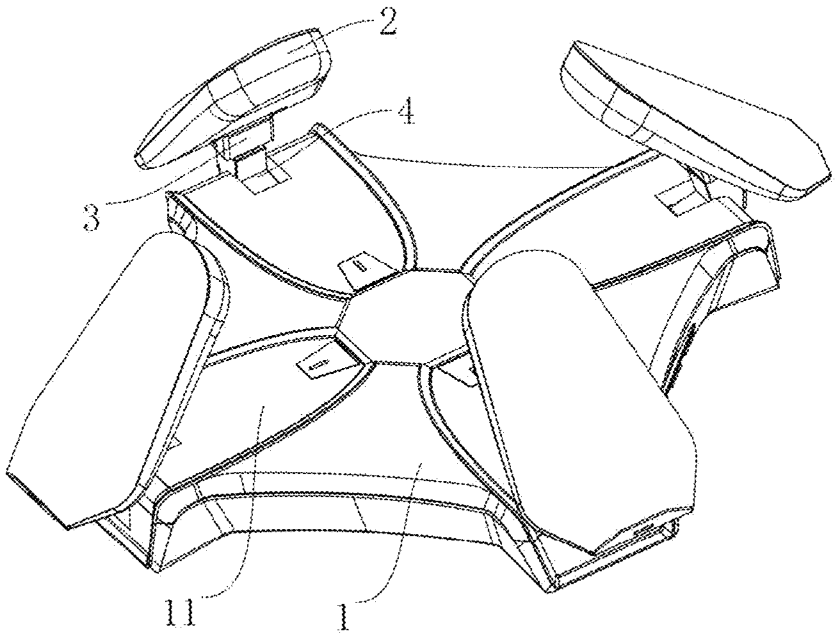
FIG. 8 is a schematic view showing an appearance of the router described with reference to FIG. 7.
Figure 9:
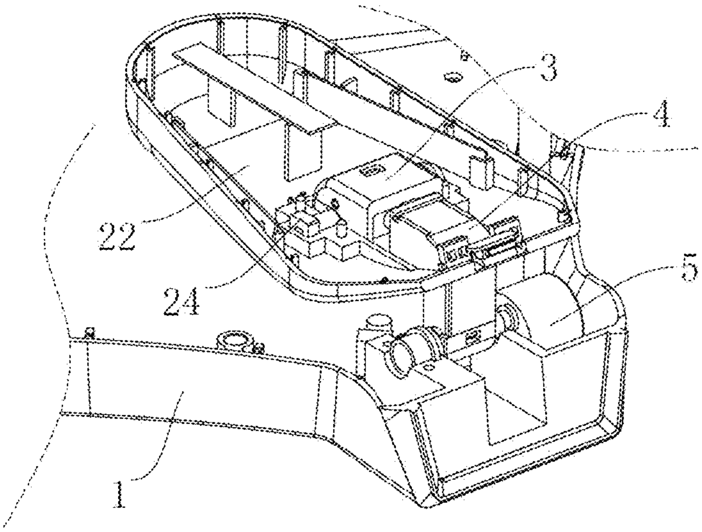
FIG. 9 is a local structural schematic view of a router according to an embodiment of the present disclosure.
Figure 10:
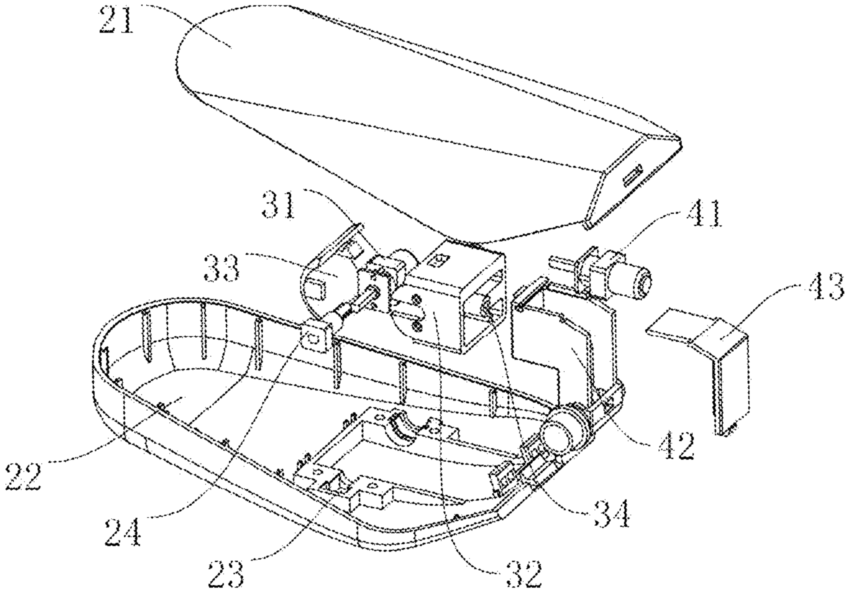
FIG. 10 is an exploded schematic view of a router according to an embodiment of the present disclosure.
Figure 11:
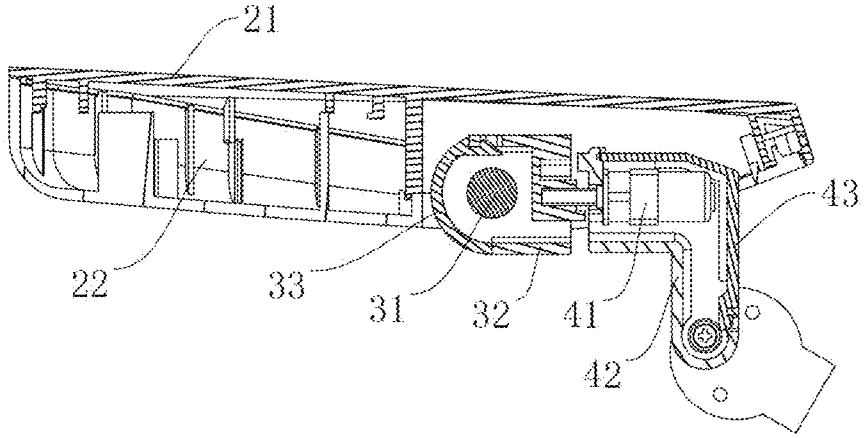
FIG. 11 is a cross-sectional schematic view of a router according to an embodiment of the present disclosure.
Figure 12:
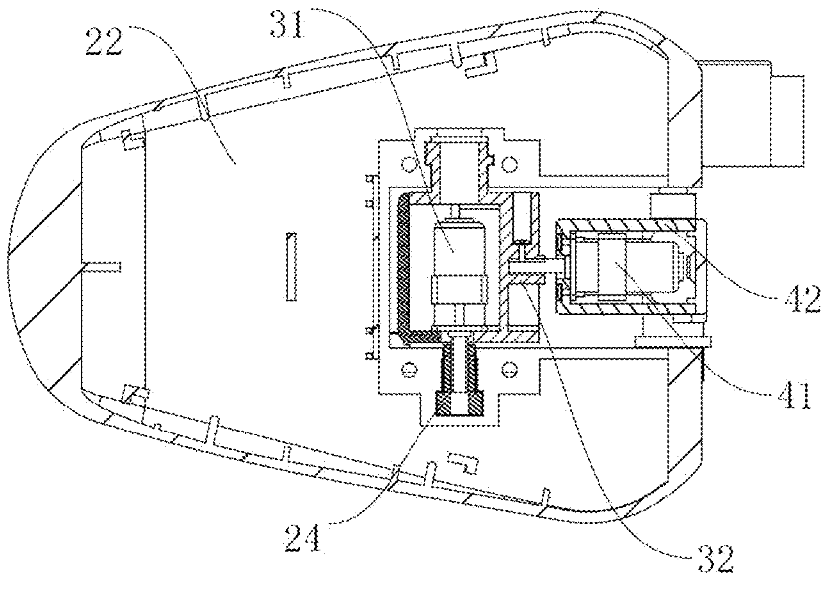
FIG. 12 is another cross-sectional schematic view of a router according to an embodiment of the present disclosure.

FIG. 8 is a schematic view showing an appearance of router 10 described with reference to FIG. 7, which shows a positional relationship between the antenna component 24 and router 10. FIG. 9 is a partial structural schematic view of router 10 according to an embodiment of the present disclosure. FIG. 10 is an explosion schematic view of router 10 according to an embodiment of the present disclosure. FIG. 11 is a cross-sectional schematic view of router 10 according to an embodiment of the present disclosure. FIG. 12 is another sectional schematic view of a router 10 according to an embodiment of the present disclosure.

Referring to FIG. 8, a router according to an embodiment of the present disclosure includes a base 1 and at least one antenna. Taking antenna 71 as an example, antenna 71 includes an antenna body 2, a first joint component 3 and a second joint component 4. One end of the first joint component 3 is rotatably connected with the antenna body 2, the other end of the first joint component 3 is rotatably connected with one end of the second joint component 4, and the other end of the second joint component 4 is rotatably connected with the base 1.

Optionally, a rotatable connection with the antenna body 2 is realized through the first joint component 3, a rotatable connection with the base 1 is realized through the second joint component 4, and the first joint component 3 and the second joint component 4 are connected also in a rotatable way, so that a more flexible control over coverage angle of an antenna can be realized, an adjustable range of angle of an antenna can be increased, and an adjustment of angle of an antenna in different dimensions can be realized.

Exemplarily, as shown in FIG. 8, the routers according to embodiments of the present disclosure are optionally four. Of course, in other embodiments, other numbers of antennas can be disposed, which is not limited by the present disclosure.

Referring to FIG. 8, receiving grooves 11 for accommodating antennas are disposed on base 1, and the receiving grooves 11 correspond to the antennas one by one. The shape of the receiving groove 11 corresponds to that of the antenna body 2. When the device is not in use, the antenna can be folded to be received in the receiving groove 11, reducing the space occupation.

Referring to FIG. 9, in an implementation, the base 1 is internally provided with a third motor 5 (i.e., the motor $C_1$ described above) for driving the second joint component 4, the first joint component 3 and the antenna body 2 to rotate around one end of the base 1. Specifically, the third motor 5 is installed inside the base 1, the output shaft of the third motor 5 passes through one end of the second joint component 4, and the output shaft of the third motor 5 is rotatably connected with the base 1 through a bearing. When the third motor 5 is rotating, the output shaft of the third motor 5 can drive the second joint component 4 to rotate relative to the base 1, thereby driving the first joint component 3 and the antenna body 2 away from or close to the receiving groove 11, so as to realize the lifting or lowering of the antenna body 2. When the antenna body 2 is far away from the receiving groove 11, the movable space for the antenna body 2 increases, which is beneficial to further adjusting the angle of the antenna body 2.

Referring to FIGS. 9 and 10, the first joint component 3 is internally provided with a first motor 31 (i.e., the motor $A_1$ described above) for driving the antenna body 2 to rotate around the first joint component 3. In this embodiment, a connecting piece 24 is fixedly disposed in the antenna body 2, and the output shaft of the first motor 31 is engaged with the connecting piece 24.

Specifically, antenna body 2 includes an antenna upper cover 21 and an antenna bottom case 22, in which the antenna upper cover 21 is engaged with the antenna bottom case 22, and an accommodating groove 23 is disposed on the antenna bottom case 22 for accommodating the connecting piece 24. The connecting piece 24 can be a square-shaped connecting block, the shape of the accommodating groove 23 fits the connecting piece 24, and the output shaft of the first motor 31 is engaged with the connecting piece 24. For example, when the output shaft of the first motor 31 is a D-shaped shaft, a D-shaped hole is disposed on the connecting piece 24, and the D-shaped shaft is engaged with the D-shaped hole. After the antenna upper cover 21 and the antenna bottom case 22 are pressed tightly, the connecting piece 24 is confined in the accommodating groove 23. When the first motor 31 is rotating, the antenna body 2 can be driven by the connecting piece 24 to rotate relative to the output shaft of the first motor 31. Through the adjustment by the first motor 31, the one end of the antenna body 2 close to the base 1 can be lifted, thereby avoiding a collision between the antenna body 2 and the base 1 when the antenna body 2 is further rotated.

Referring to FIGS. 10 and 11, further, the first joint component 3 includes a first bracket 32 and a first cover 33, in which the first bracket 32 is rotatably connected with the antenna body 2, the first motor 31 is fixedly disposed in the first bracket 32, and the first cover 33 is disposed at the opening of the first bracket 32. The first cover 33 may be fixedly connected with the first bracket 32 by screws, or may be engaged with the first bracket 32. The output shaft of the first motor 31 extends from the first bracket 32 and is engaged with the connecting piece 24. It should be noted that the one end of the first bracket 32 far from the output shaft of the first motor 31 can be connected with the antenna bottom case 22 through a bearing. For convenience of installation, the shape of the first bracket 32 may correspond to that of the first motor 31. In other embodiments, the first bracket 32 may take other shapes, which is not limited by the present disclosure.

Referring to FIGS. 10 and 11, the second joint component 4 is internally provided with a second motor 41 (i.e., the motor $B_1$ described above) for driving the first joint component 3 and the antenna body 2 to rotate around the second joint component 4. Specifically, the one side of the first bracket 32 close to the second motor 41 is provided with a connecting column, on which an engaging hole 34 is disposed, and the output shaft of the second motor 41 is engaged with the engaging hole 34. Exemplarily, the output shaft of the second motor 41 is a D-shaped shaft, and the engaging hole 34 is a D-shaped hole, both of which can be engaged. When the second motor 41 is rotating, the first joint component 3 can be driven to rotate relative to the second joint component 4, at which time the antenna body 2 moves together with the first joint component 3, thereby realizing the angle adjustment of the antenna body 2.

Referring to FIGS. 11 and 12, further, the second joint component 4 includes a second bracket 42 and a second cover 43, in which the second bracket 42 has a roughly L-shaped cross-section, one end of the second bracket 42 is rotatably connected with one end of the first bracket 32, the other end of the second bracket 42 is rotatably connected with the base 1, a second motor 41 is fixedly disposed in the second bracket 42, the second cover 43 is disposed at the opening of the second bracket 42, and the second cover 43 may be connected with the second bracket 42 by screws. When the second motor 41 is installed, the output shaft of the second motor 41 extends from the second bracket 42 and is engaged with the engaging hole 34 on the first bracket 32.

Optionally, one end of the first joint component 3 may also be rotatably connected with the antenna body 2 through a damper piece, the other end of the first joint component 3 is rotatably connected with one end of the second joint component 4 through a damper piece, and the other end of the second joint component 4 is rotatably connected with the base 1 through a damper piece.

Figure 13:
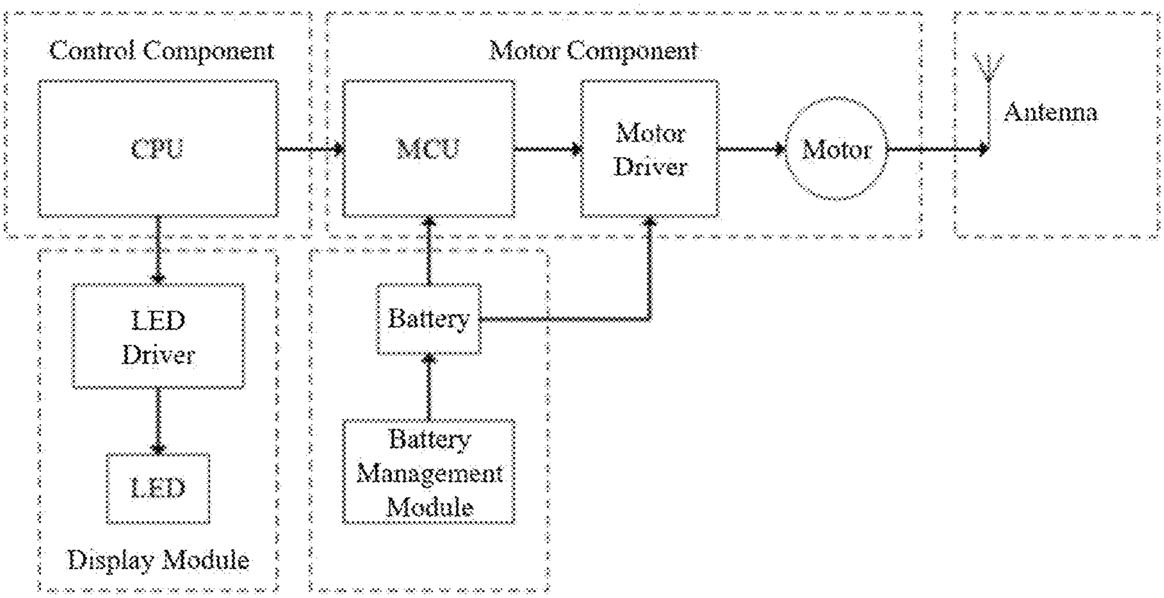
FIG. 13 is a structural schematic diagram of a system for adjusting an angle of an antenna according to an embodiment of the present disclosure.

Referring to FIG. 13, the embodiments of the present disclosure also provide a system for adjusting an angle of an antenna, including a control component, a motor component and an antenna component, in which the antenna component includes at least one antenna, each of which corresponds to at least one motor, the control component is communicatively connected with the motor component, and the control component and the motor component together form the control device 20 to perform the method 300.

As described above, the control device 20 is configured to: acquire, by the control component, a rotation angle of at least one antenna in an initial adjustment, generate an instruction corresponding to the rotation angle of the at least one antenna in the initial adjustment, and send the instruction to the motor component; control, by the motor component, the at least one antenna to rotate by the rotation angle based on the instruction; and iteratively control, in a plurality of adjustments after the initial adjustment, the at least one antenna to rotate until an iterative termination condition is met, in which the iteratively controlling the at least one antenna to rotate includes: in each of the plurality of adjustments, determining, by the control component, a difference between a value of a received signal strength indicator of the at least one antenna after the previous adjustment and a value of a received signal strength indicator of the at least one antenna before the previous adjustment; determining, by the control component, the rotation angle of the at least one antenna in the current adjustment based on the difference and the rotation angle of the at least one antenna in the previous adjustment; generating, by the control component, an instruction corresponding to the current adjustment based on the rotation angle of the at least one antenna in the current adjustment, and sending the instruction corresponding to the current adjustment to the motor component; and controlling, by the motor component, the at least one antenna to rotate by the rotation angle based on the instruction corresponding to the current adjustment.

Optionally, the iterative termination condition includes at least one of: the values of received signal strength indicators before and after one of the plurality of adjustments being less than a preset value, the antenna having been rotated to a maximum achievable angle, and the number of adjustments having reached an adjustment number threshold.

Optionally, each of the at least one antenna is controlled by at least one motor in the motor component, and each of the at least one motor is used to drive the antenna to rotate around a rotation axis in space.

Optionally, the instruction corresponding to the rotation angle of the at least one antenna in each of adjustments includes a number of pulses corresponding to each motor in the motor component, and the rotation angle of each motor in this adjustment is equal to a product of a stepping angle of the motor and the number of pulses corresponding to the motor.

Further, the system further includes a battery management module and a battery, in which the battery management module is used for controlling the charging of the battery when the system is powered on, and the battery is used for supplying power to the motor component when the system is powered off.

Figure 14:
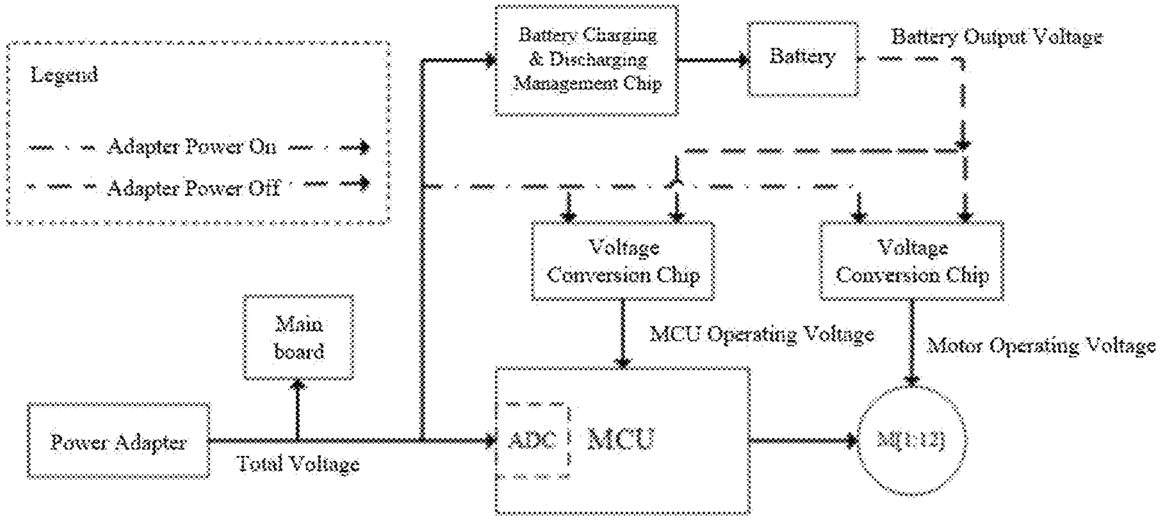
FIG. 14 is a schematic diagram of operations of a battery management module according to an embodiment of the present disclosure.

Referring to FIG. 14, the battery management module mainly plays a role after the whole equipment product is powered off. When the whole equipment is powered off, the battery continues to supply power to the motor control module, so that the antenna automatically returns to the default closed-up state; whereas during normal operation of the whole equipment, the battery management module can charge the battery.

The operating process of the battery management module is as follows:

(1) During normal power-on of a power adapter, the power adapter provides a total voltage to supply power to a mainboard, and at the same time to supply power to an MCU board after voltage conversion, and also charges the battery through a battery charging and discharging management chip;

(2) When the total voltage provided by the power adapter falls below a preset threshold, the battery charging and discharging management chip may control the battery to output a voltage at this time to guarantee that the MCU and the motor will not be powered off and can continue to operate normally;

(3) The MCU may constantly monitor the total voltage provided by the power adapter through its own ADC (Analog to Digital Conversion), and when the total voltage is monitored to be below the preset threshold, the MCU may perform an action of restoring the motor to the default closed-up state. After the whole equipment is powered off, the antenna may automatically return to the default closed-up state, which increases the friendliness of the product.

Further, the system further includes a display module, which is communicatively connected with the main control module and is used for indicating a rotating state of antenna. Exemplarily, the display module can be a LED and can be LED-driven. When the antenna is being rotated, the LED shows a flashing or breathing effect, and when the antenna is rotated to the target position, the LED may show a constant on state, which can indicate whether the adjustment of a coverage angle of an antenna is completed. Through the indication of the LED, the user can be clearly told whether the antenna has been adjusted to an appropriate position, improving the convenience of the product used.

Further, the system is also equipped with an APP for use by the user, in which a plurality of antenna coverage angles are preset for signal enhancement in different usage scenarios, such as flat/skip layer signal enhancement, front side/back side signal enhancement and left side/right side signal enhancement. The user can achieve an effect of "enhancement with one click" through such options.

The system provided by the present disclosure can be applied:

(1) to communication between general wireless equipment and terminal equipment, in which the communication quality can be improved by adjusting the coverage angle of the antenna of the wireless equipment; and the change in position of the terminal equipment in real-time can be tracked as the position changes, thereby adjusting the angle of an antenna in real-time and guaranteeing the continuity of good user experience;

(2) in wireless networking, in which some antennas face towards inside of the network and some antennas face towards the terminal equipment, improving the performance in both directions;

(3) in wireless positioning, in which the target position can be tracked by wireless algorithm and antenna rotation.

To sum up, the embodiments of the present disclosure detect for a better value of RSSI step by step, and when the iterative termination condition is met, the antenna angle adjustment ends and the antenna is rotated to a position with better RSSI. Meanwhile, through the selection of suitable initial parameters, a position with better RSSI can be found with a small number of iterations, thereby quickly finding an angle with a stronger antenna signal. Some embodiments of the present disclosure also conduct control over rotation angles of a plurality of motors by means of establishing a model, improving the synchronization of the control over the plurality of motors, also improving the control efficiency, and facilitating the simulation and realization of the control over the rotation of mechanical antennas. Correspondingly, the present disclosure also provides a device and a system for adjusting an angle of an antenna.

In addition, the embodiments of the present disclosure also provide a method for adjusting an angle of an antenna, which is performed by a main control module and includes: acquiring an initial RSSI value; generating, with an initial value of i as 1, an instruction according to the i-th rotation step-size and sending it to a motor control module, so that the motor control module controls an antenna to rotate according to the instruction and a pre-configured motion control model; acquiring an RSSI value after the rotation of the antenna, and calculating a difference between the initial RSSI value and the RSSI value after the rotation; updating the i-th rotation step-size to obtain the (i+1)th rotation step-size; deciding whether an iterative termination condition is met, and if so, ending the adjustment of angle of an antenna; or if not, adding one to i, and returning to the step of generating an instruction according to the i-th rotation step-size and sending it to a motor control module.

Optionally, the deciding whether an iterative termination condition is met includes: when the absolute value of the difference is less than a preset convergence accuracy, or when the (i+1)th rotation step-size is greater than a preset rotation boundary, or when i is greater than or equal to a preset maximum number of iterations, deciding that the iterative termination condition is met.

Optionally, the method further includes: calculating a step-size gradient according to the difference and the i-th rotation step-size; deciding whether the absolute value of the step-size gradient is greater than a preset gradient threshold, and if so, deciding that an overshoot phenomenon occurs; or if not, deciding that no overshoot phenomenon occurs.

Optionally, upon deciding that an overshoot phenomenon occurs, updating the i-th rotation step-size to obtain the (i+1)th rotation step-size includes: obtaining, upon deciding that the difference is greater than zero, an updated momentum according to the step-size gradient, a preset learning rate and a momentum attenuation factor; obtaining the (i+1)th rotation step-size according to the i-th rotation step-size, the momentum attenuation factor and the updated momentum; updating, upon deciding that the difference is less than zero, the momentum to zero, and obtaining the (i+1)th rotation step-size according to the step-size gradient, the learning rate and the momentum attenuation factor.

Optionally, upon deciding that no overshoot phenomenon occurs, the updating the i-th rotation step-size to obtain the (i+1)th rotation step-size includes: obtaining, upon deciding that the difference is greater than zero, the updated momentum according to the step-size gradient, a preset learning rate and a momentum attenuation factor; obtaining the (i+1)th rotation step-size according to the i-th rotation step-size and the momentum attenuation factor; obtaining, upon deciding that the difference is less than zero, an updated momentum according to the step-size gradient, the learning rate, the momentum attenuation factor and a preset initial momentum; and derive the opposite number of the updated momentum to obtain the (i+1)th rotation step-size.

Optionally, after the (i+1)th rotation step-size is obtained, the method further includes: applying normative constraint on the (i+1)th rotation step-size.

The present disclosure provides a device for adjusting an angle of an antenna, which is disposed in a main control module and includes: a data acquisition module, for acquiring an initial RSSI value; an instruction module, for generating, with an initial value of i as 1, an instruction according to the i-th rotation step-size and sending it to the motor control module, so that the motor control module controls an antenna to rotate according to the instruction and a pre-configured motion control model; a difference calculation module, for obtaining an RSSI value after the rotation of the antenna and calculating a difference between the initial RSSI value and the RSSI value after the rotation; a step-size update module, for updating the i-th rotation step-size to obtain the (i+1)th rotation step-size; an iteration decision module, for deciding whether an iterative termination condition is met, and if so, ending the adjustment of angle of an antenna; or if not, adding one to i, and returning to the step of generating an instruction according to the i-th rotation step-size and sending it to the motor control module.

The present disclosure also provides a method for adjusting an angle of an antenna, which is performed by a motor control module and includes: receiving an instruction sent by a main control module; and controlling an antenna to rotate according to the instruction and a pre-configured motion control model. Optionally, the controlling the antenna to rotate according to the instruction and a pre-configured motion control model includes: establishing a motor angle matrix based on the rotation angles of all the motors on the antenna; obtaining a current angle matrix according to the motor angle matrix and the current angle state of the antenna; obtaining a target angle matrix according to the motor angle matrix and the instruction; calculating a matrix difference between the target angle matrix and the current angle matrix, and controlling the antenna to rotate according to the matrix difference.

Optionally, the controlling the antenna to rotate according to the instruction and a pre-configured motion control model includes: acquiring a stepping angle of each motor; constructing a stepping angle function with respect to the target position of the motor according to the stepping angle, and acquiring a coefficient matrix of the stepping angle function; obtaining the values given to the coefficient matrix according to the instruction, and controlling the antenna to rotate according to the values given to the coefficient matrix.

The present disclosure also provides a device for adjusting an angle of an antenna, which is disposed in a motor control module and includes: a receiving module, for receiving an instruction sent by the main control module; and a motion control module, for controlling an antenna to rotate according to the instruction and a pre-configured motion control model.

In a fifth aspect, the present disclosure also provides a system for adjusting an angle of an antenna, which includes a main control module, a motor control module and at least one antenna, in which at least one motor is disposed on the antenna, the main control module is communicatively connected with the motor control module, the main control module is used for performing the method for adjusting an angle of an antenna according to any of the first aspects, and the motor control module is used for performing the method for adjusting an angle of an antenna according to any of the third aspects.

Optionally, the system further includes a battery management module and a battery, in which the battery management module is used for controlling the charging of the battery when the system is powered on, and the battery is used for supplying power to the motor control module when the system is powered off.

Optionally, the system further includes a display module, which is communicatively connected with the main control module and is used for indicating the rotating state of the antenna.

The embodiments of the present disclosure also provide an antenna angle adjusting device including a base and at least one antenna, in which the antenna includes an antenna body, a first joint component and a second joint component; one end of the first joint component is rotatably connected with the antenna body, the other end of the first joint component is rotatably connected with one end of the second joint component, and the other end of the second joint component is rotatably connected with the base.

Optionally, the first joint component is internally provided with a first motor for driving the antenna body to rotate around the first joint component; the second joint component is internally provided with a second motor for driving the first joint component and the antenna body to rotate around the second joint component; the base is internally provided with a third motor for driving the second joint component, the first joint component and the antenna body to rotate around one end of the base.

Optionally, the embodiments of the present disclosure also provide a router, including the antenna angle adjusting device as described above.

It should be noted that the device embodiments described above are merely schematic, in which the units described as separate components may or may not be physically separated, and the components illustrated as units may or may not be physical units, that is, they may be located in one place or distributed across multiple network units. Some or all of the modules can be selected according to actual needs to achieve the purpose the schemes of the embodiments. Additionally, in the drawings of the device embodiments provided by the present disclosure, the connective relationship between the modules indicates that there are communication connections between them, which may be specifically implemented as one or more communication buses or signal lines. Those ordinary skilled in the art can understand and implement it without creative labor.

The above-described specific embodiments further illustrate the objectives, technical schemes and beneficial effects of the present disclosure in detail. It should be understood that the above described are only specific embodiments of the present disclosure and are not used to limit the protection scope of the present disclosure. In particular, it is pointed out that any modification, equivalent substitution, improvement, etc. made within the spirit and principle of the present disclosure should be included in the protection scope of the present disclosure.

The invention claimed is:

1. A control method, comprising:

acquiring a rotation angle of an antenna in an initial adjustment, and controlling, through a motor component, the antenna to rotate by the rotation angle in the initial adjustment; and iteratively controlling, through the motor component and in a plurality of adjustments after the initial adjustment, the antenna to rotate until an iterative termination condition is met, wherein the iteratively controlling, through the motor component, the antenna to rotate comprises:

in each of the plurality of adjustments, determining a difference between a value of a received signal strength indicator of the antenna after a previous adjustment and a value of a received signal strength indicator of the antenna before the previous adjustment; and determining a rotation angle of the antenna in a current adjustment based on the difference and a rotation angle of the antenna in the previous adjustment, and controlling, through the motor component, the antenna to rotate by the rotation angle in the current adjustment, wherein the determining the rotation angle of the antenna in the current adjustment based on the difference and the rotation angle of the antenna in the previous adjustment comprises:

determining, in response to the difference being greater than zero, the rotation angle of the antenna in the current adjustment based on the rotation angle of the antenna in the previous adjustment, wherein a direction of the rotation angle of the antenna in the current adjustment is opposite to that of a rotation angle of the antenna in the previous adjustment; and determining, in response to the difference being less than or equal to zero, that the rotation angle of the antenna in the current adjustment is positively correlated with the rotation angle of the antenna in the previous adjustment.

2. The control method according to claim 1, wherein the iterative termination condition includes at least one of:

the difference between values of received signal strength indicators before and after one of the plurality of adjustments being less than a preset value, the antenna having been rotated to a maximum achievable angle, and the number of adjustments having reached an adjustment number threshold.

3. The control method according to claim 1, wherein the determining the rotation angle of the antenna in the current adjustment based on the difference and the rotation angle of the antenna in the previous adjustment comprises:

acquiring, in response to the difference being less than or equal to zero, a momentum of the antenna in the previous adjustment;

determining a momentum of the antenna in the current adjustment based on the rotation angle of the antenna in the previous adjustment, the difference and the momentum of the antenna in the previous adjustment; and determining the rotation angle of the antenna in the current adjustment based on the momentum of the antenna in the current adjustment;

wherein a momentum of the antenna in ana i-th adjustment indicates an influence of a rotation angle in the (i−1)th adjustment on the rotation angle in the i-th adjustment, where i is a positive integer greater than 1.

4. The control method according to claim 3, wherein the determining the rotation angle of the antenna in the current adjustment based on the difference and the rotation angle of the antenna in the previous adjustment comprises:

calculating a step-size gradient based on the difference and the rotation angle of the antenna in the previous adjustment;

determining, in response to the step-size gradient being greater than a preset gradient threshold, that an overshoot phenomenon occurs; and determining, in response to the step-size gradient being less than or equal to the preset gradient threshold, that no overshoot phenomenon occurs.

5. The control method according to claim 4, further comprising:

determining, in response to determining that an overshoot phenomenon occurs, whether the difference is greater than zero;

determining, in response to determining that the difference is greater than zero, the rotation angle of the antenna in the current adjustment based on the step-size gradient and the rotation angle of the antenna in the previous adjustment; and determining, in response to determining that the difference is less than or equal to zero, the rotation angle of the antenna in the current adjustment based on a product of the difference and the rotation angle of the antenna in the previous adjustment.

6. The control method according to claim 5, further comprising:

determining, in response to determining that an overshoot phenomenon occurs and the difference is greater than zero, the momentum of the antenna in the current adjustment based on the step-size gradient, wherein an absolute value of the momentum of the antenna in the current adjustment is positively correlated with the step-size gradient; and determining the rotation angle of the antenna in the current adjustment based on the momentum of the antenna in the current adjustment and the rotation angle of the antenna in the previous adjustment.

7. The control method according to claim 1, wherein the antenna is controlled by at least one motor in the motor component, and each of the at least one motor is used to control the antenna to rotate around a rotation axis in space.

8. A control component, configured to:

generate, in a process of iteratively adjusting an angle of at least one antenna, an instruction indicating the at least one antenna to rotate in each of plurality of adjustments based on a corresponding received signal strength indicator of the at least one antenna;

wherein, in an initial adjustment, the instruction indicates that a rotation angle of the antenna in this adjustment is a preset value, or the instruction indicates that the rotation angle of the antenna in this adjustment is a value associated with the corresponding received signal strength indicator of the at least one antenna;

in each of the adjustments except for the initial adjustment, the instruction indicates that the rotation angle of the antenna in this adjustment is associated with the rotation angle of the antenna in a previous adjustment, wherein in each of the adjustments except for the initial adjustment, the rotation angle of the at least one antenna in this adjustment is associated with a difference between a value of a received signal strength indicator of the at least one antenna after the previous adjustment and a value of a received signal strength indicator of the at least one antenna before the previous adjustment, wherein a direction of the rotation angle of the antenna in the current adjustment is opposite to that of a rotation angle of the antenna in the previous adjustment in response to the difference being greater than zero, and wherein the rotation angle of the antenna in the current adjustment is positively correlated with the rotation angle of the antenna in the previous adjustment in response to the difference being less than or equal to zero.

9. The control component according to claim 8, wherein the process of iteratively adjusting the angle of at least one antenna is terminated when an iterative termination condition is met, and the iterative termination condition includes at least one of:

the difference between values of received signal strength indicators of the at least one antenna before and after one of the plurality of adjustments being less than a preset value, the at least one antenna having rotated to a maximum achievable angle, and the number of adjustments having reached an adjustment number threshold.

10. A control device comprising a control component and a motor component, the control device being configured to:

acquire, by the control component, a rotation angle of at least one antenna in an initial adjustment, generate an instruction corresponding to the rotation angle of the at least one antenna in the initial adjustment, and send the instruction to the motor component;

control, by the motor component, the at least one antenna to rotate by the rotation angle based on the instruction; and iteratively control, in a plurality of adjustments after the initial adjustment, the at least one antenna to rotate until an iterative termination condition is met, wherein the iteratively controlling the at least one antenna to rotate comprises:

in each of the plurality of adjustments, determining, by the control component, a difference between a value of a received signal strength indicator of the at least one antenna after a previous adjustment and a value of a received signal strength indicator of the at least one antenna before the previous adjustment;

determining, by the control component, a rotation angle of the at least one antenna in a current adjustment based on the difference and a rotation angle of the at least one antenna in a previous adjustment, wherein determining the rotation angle of the at least one antenna in the current adjustment based on the difference and the rotation angle of the at least one antenna in the previous adjustment comprises:

determining, in response to the difference being greater than zero, the rotation angle of the at least one antenna in the current adjustment based on the rotation angle of the at least one antenna in the previous adjustment, wherein a direction of the rotation angle of the at least one antenna in the current adjustment is opposite to a direction of the rotation angle of the at least one antenna in the previous adjustment; and determining, in response to the difference being less than or equal to zero, the rotation angle of the at least one antenna in the current adjustment such that the rotation angle of the at least one antenna in the current adjustment is positively correlated with the rotation angle of the at least one antenna in the previous adjustment;

generating, by the control component, an instruction corresponding to the current adjustment based on the rotation angle of the at least one antenna in the current adjustment, and sending the instruction corresponding to the current adjustment to the motor component; and controlling, by the motor component, the at least one antenna to rotate by the rotation angle based on the instruction corresponding to the current adjustment.

11. The control device according to claim 10, wherein the iterative termination condition includes at least one of: the difference between the values of received signal strength indicators before and after one of the plurality of adjustments being less than a preset value, an antenna of the at least one antenna having been rotated to a maximum achievable angle, and the number of adjustments having reached an adjustment number threshold.

12. The control device according to claim 11, wherein each of the at least one antenna is controlled by at least one motor in the motor component, and each of the at least one motor is used to drive the at least one antenna to rotate around a rotation axis in space.

13. The control device according to claim 12, wherein, the instruction corresponding to the rotation angle of the at least one antenna in each of adjustments includes a number of pulses corresponding to each motor in the motor component, and a rotation angle of each motor in this adjustment is equal to a product of a stepping angle of the motor and a number of pulses corresponding to the motor.

* * * * *